United States Patent Office 3,639,405
Patented Feb. 1, 1972

3,639,405
PROCESS FOR PREPARING 3'-HYDROXYQUINO-
PHTHALONE-5-CARBOXYLIC ACIDS
Richard L. Walker, Pennsville, N.J., assignor to E. I. du
Pont de Nemours and Company, Wilmington, Del.
No Drawing. Filed June 17, 1968, Ser. No. 737,298
Int. Cl. C07d 33/48
U.S. Cl. 260—287 R      3 Claims

ABSTRACT OF THE DISCLOSURE

An improved condensation of trimellitic anhydrides and 3-hydroxy-2-methylquinoline-4-carboxylic acids to yield 3'-hydroxyquinophthalone-5-carboxylic acids useful as dye-stuff intermediates, said improvement comprising carrying out the condensation of reactants, in approximately equimolar portions, in a slurrying quantity of a fatty and/or rosin acid, at a temperature of 160° C. to the boiling point of the fatty and/or rosin acid.

BACKGROUND OF THE INVENTION

This invention relates to an improved process for preparing 3'-hydroxyquinophthalone-5-carboxylic acids by condensing a trimellitic anhydride with a 3-hydroxy-2-methylquinoline-4-carboxylic acid.

Derivatives of 3'-hydroxyquinophthalone-5-carboxylic acids are useful as dyes in a wide variety of applications. Prior art on the preparation of said acids, their derivatives and uses includes U.S. Pats. 3,023,212–4, issued Feb. 27, 1962. Disclosed herein, for example, is the reaction of trimellitic anhydride and a 3-hydroxy-2-methylquinoline-4-carboxylic acid to produce, in moderate yields, a 3'-hydroxyquinophthalone-5-carboxylic acid. The reaction is carried out in an inert organic solvent such as trichlorobenzene or o-dichlorobenzene at 165° C. to 200° C.

SUMMARY OF THE INVENTION

The object of this invention is to provide an improved process for preparing 3'-hydroxyquinophthalone-5-carboxylic acids by condensation of a trimellitic anhydride with a 3-hydroxy-2-methylquinoline - 4 - carboxylic acid. More particularly, an object is to provide such a process whereby the quinophthalone acid is produced in a yield of 90–100%.

DESCRIPTION OF INVENTION

The present invention consists in an improved process for preparing 3'-hydroxyquinophthalone - 5 - carboxylic acids by condensing, at an elevated temperature, a trimellitic anhydride with a 3-hydroxy-2-methylquinoline-4-carboxylic acid, said improvement consisting of condensing in approximately equimolar quantities,

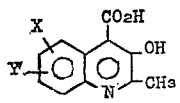

wherein X is H, Cl, Br, $CH_3$, CN, $NO_2$, $OCH_3$, $CH_3CONH$ or phenyl, and Y is H, Cl, Br or $CH_3$, or X and Y jointly is the diradical CH=CH—CH=CH, and

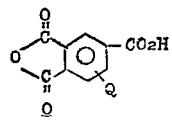

wherein Q is H, Cl, Br, $NO_2$, $CO_2H$, phenylcarbonyl or phenyl, in a slurrying quantity of a fatty and/or rosin acid, at a temperature of 160° C. to the boiling point of the fatty and/or rosin acid, to form

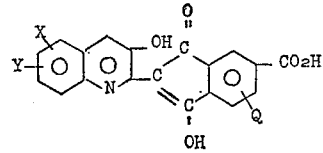

wherein X, Y and Q are as defined above.

The preferred methylquinoline (quinaldine) reactant is 3-hydroxy-2-methylquinoline-4-carboxylic acid. Other useful quinaldines include those such as described in U.S. Pats. 3,023,212 and 3,023,214, French Pats. 784,365 and 1,403,435, and British Pat. 1,062,769, and particularly:

6,8-dibromo-3-hydroxy-2-methylquinoline-4-carboxylic acid,
6,8-dichloro-3-hydroxy-2-methylquinoline-4-carboxylic acid,
3-hydroxy-2-methyl-5,6-benzoquinoline-4-carboxylic acid,
7-chloro-3-hydroxy-2,8-dimethylquinoline-4-carboxylic acid,
6-chloro-3-hydroxy-2-methylquinoline-4-carboxylic acid,
3-hydroxy-2-methyl-6-phenylquinoline-4-carboxylic acid,
2,8-dimethyl-3-hydroxyquinoline-4-carboxylic acid,
2-methyl-3-hydroxy-6-bromoquinoline-4-carboxylic acid,
2-methyl-3-hydroxy-8-bromoquinoline-4-carboxylic acid,
2-methyl-3-hydroxy-6-cyanoquinoline-4-carboxylic acid,
2-methyl-3-hydroxy-5-chloroquinoline-4-carboxylic acid,
2-methyl-3-hydroxy-6-nitroquinoline-4-carboxylic acid,
2-methyl-3-hydroxy-6-methoxyquinoline-4-carboxylic acid,
2-methyl-3-hydroxy-6-methylquinoline-4-carboxylic acid,
2-methyl-3-hydroxy-6-acetylaminoquinoline-4-carboxylic acid,
2-methyl-3-hydroxy-6,7-dichloroquinoline-4-carboxylic acid,
2-methyl-3-hydroxy-6-chloro-8-methylquinoline-4-carboxylic acid,
2-methyl-3-hydroxy-5-methyl-8-methoxyquinoline-4-carboxylic acid,
2-methyl-3-hydroxy-6,7-benzquinoline-4-carboxylic acid, and
2-methyl-3-hydroxy-7,8-benzquinoline-4-carboxylic acid.

The preferred trimellitic anhydride is trimellitic anhydride itself, although substituted anhydrides as defined in the above formula wherein Q is other than H are also operable.

A critical feature of this process is the use of a diluent, namely, a fatty and/or rosin acid, as a liquid reaction medium. The preferred diluent, because of its low cost and ready availability, is tall oil, defined in "Merck Index," 6th edition, as:

"A by-product of the wood pulp industry. Usually recovered from pine wood 'black liquor' of the sulfate or kraft paper process. Contains rosin acids, oleic and linoleic acids. Long chain alcohols and small amounts of sterols, especially phytosterol, have also been found. Dark-brown liquid. d. 0.95 to 1.0 $n_D{}^2$ approx. 1.5. Acid No. 170–180. Sapon. No. 172–185. Iodine No. 120–188. Fatty acids 50–60%. Rosin acids 34–40%. Unsaponifiable matter 5–10%."

Other useful diluents are long-chain fatty acids capable of being heated above 170° C. Representative fatty acids include oleic, pelargonic, lauric, palmitic, caprylic, stearic and naphthenic acids. Mixtures of rosin and/or fatty acids may be used. Sufficient diluent is employed to provide an agitatable slurry of reactants, and the product as it is formed. There is no upper limit on the amount of diluent employed other than is dictated by convenience, economics, and the like. With the aforesaid preferred reactants and diluent the preferred amount of diluent is, by weight, 3 to 5 parts per one part of each reactant, equal parts of reactants representing approximately equimolar quantities since the molecular weights are approximately equal.

Although the stoichiometry of the condensation reaction requires equimolar quantities of reactants, an excess of either reactant may be employed. Normally, large excesses of either are avoided since this merely leads to contamination of the product with starting material. Usually, approximately equimolar quantities of reactants are used although an especially preferred process employs about a 5% excess of the trimellitic anhydride.

The reaction is carried out at a temperature of about 160° C. to the boiling point of the fatty and/or rosin acid. The preferred reaction temperature is 210–220° C. Temperatures above 225° C. may be employed but these are not as readily attained and maintained with conventional equipment.

The time of reaction is determined by the temperature employed, shorter reaction times being required at higher temperatures. With the preferred reactants and diluent, the reaction proceeds to essential completion in about 96 hours at 160° C. At 190° C. this time is reduced to about 20 hours, and at the preferred temperature range, to about 2 hours.

The reaction appears to be principally heterogenous; i.e., the reactants and product are only slightly soluble in the diluent. Isolation is quick, cheap, and convenient. Moreover, since the reaction is essentially quantitative yields of 90–100% are obtained, the requirement to free the product from unreacted starting materials and undesired by-products is minimized. Isolation involves merely cooling the reaction mass, adding a diluting solvent, agitating for a short period, filtering, washing, preferably with the same (diluting) solvent, and if desired, drying. A preferred solvent for diluting the reaction mass and for washing the product free from rosin and/or fatty acids is chlorobenzene. Other useful inexpensive solvents include 91% isopropyl alcohol, anhydrous isopropyl alcohol, methyl or ethyl alcohol, o-dichlorobenzene, glycols, and the like.

EXAMPLE I 3-hydroxy-2-methylquinoline-4-carboxylic acid (100 parts) and trimellitic anhydride (100 parts) were added to tall oil (500 parts, "Indusol" M-28 sold by West Virginia Pulp and Paper Co.). The mixture was agitated to form a smooth slurry. The mixture was heated as rapidly as possible to 210–220° C., allowing for the escape of $CO_2$ and $H_2O$ formed. The reaction mass was held at 210–220° C. for two hours, during which time the color changed from light tan to deep brownish-yellow and the viscosity of the slurry diminished appreciably. The reaction mixture was cooled to 120–130° C., resulting in a viscous slurry. After blanketing the reaction mixture with nitrogen, 381 parts of chlorobenzene were added to dilute the mass. A reflux condenser was required to retain the chlorobenzene. The diluted reaction mass was then cooled to 50–60° C. and agitated for two hours at this temperature. The product 3'-hydroxquinophthalone-5-carboxylic acid was isolated from the thin slurry by filtration and was washed free of tall oil with 762 parts of chlorobenzene and dried. The yield was 90–100% of theory.

EXAMPLE II

The same quantities of quinoline derivative and anhydride used in Example I were slurried with 500 parts of crude tall oil. This mixture was then heated as rapidly as possible to 190–200° C. with vent open to release $H_2O$ and $CO_2$ formed. The reaction mass was held at 190–200° C. for eight hours, with an appreciable decrease in viscosity after the first 1–2 hours; the color of mass changed from a light tan to a deep brownish-yellow. The reaction mass was cooled to 85–90° C., resulting in a viscous slurry. After blanketing the flask with nitrogen 262 parts of 91% isopropyl alcohol were added to dilute the mass. A reflux condenser was required to retain the alcohol. The reaction mass was then cooled to 35–40° C. with agitation, filtered, and washed with 600 parts of 91% isopropyl alcohol or until the wash liquor became pale yellow, indicating removal of the tall oil. The product was then washed for one hour with cold water to remove residual alcohol, then for 8 to 12 hours with 75–80° C. water. The product was dried at 100° C. The yield of 3'-hydroxyquinophthalone-5-carboxylic acid was 140–143 parts/100 parts of quinoline starting material.

EXAMPLE III

Prior art preparation of 3'-hydroxyquinophthalone-5-carboxylic acid 3-hydroxy-2 - methylquinoline - 4-carboxylic acid (1 part), trimellitic anhydride (1.26 parts), dimethyl formamide (0.5 part) and o-dichlorobenzene (10 parts) were combined and heated at 120–182° C. for 24 hours. The reaction mass was cooled to 100° C. and filtered; the product was washed with o-dichlorobenzene (5 parts). The filter cake was then subjected to a steam distillation treatment to remove residual o-dichlorobenzene. The product was filtered and dried at 100° C.; a yield of 58% was obtained.

EXAMPLE IV

Prior art preparation of 3'-hydroxyquinophthalone-5-carboxylic acid

Example III was repeated, except that trichlorobenzene (10 parts) was used as solvent and the condensation was carried out at 200–210° C. for 24 hours. The product was obtained in 59% yield.

As many apparently widely different embodiments of this invention may be made without departing from the spirit and scope thereof, it is to be understood that this invention is not limited to the specific embodiments thereof except as defined in the appended claims.

What is claimed is:

1. In an improved process for condensing, at an elevated temperature, a trimellitic anhydride and a 3-hydroxy-2-methylquinoline-4-carboxylic acid to yield a 3'-hydroxyquinophthalone-5-carboxylic acid, the improvement comprising condensing approximately equimolar quantities of the quinolinecarboxylic acid having the formula

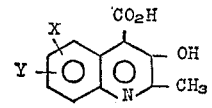

wherein X is H, Cl, Br, $CH_3$, CN, $NO_2$, $OCH_3$, $CH_3CONH$ or phenyl, and Y is H, Cl, Br or $CH_3$, or X and Y jointly is the diradical $CH{=}CH{-}CH{=}CH$ which is attached to adjacent carbon atoms of the quinoline nucleus, and the anhydride having the formula

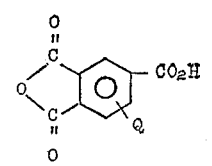

wherein Q is H, Cl, Br, $NO_2$, $CO_2H$, phenylcarbonyl or phenyl, in a slurry employing a liquid fatty acid- rosin acid mixture as the slurry medium, at a temperature of 160° C. to the boiling point of the fatty acid- rosin acid mixture, to form the quinophthalonecarboxylic acid having the formula

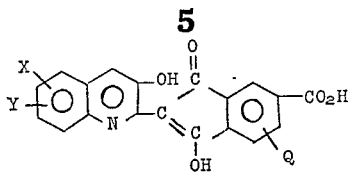

wherein X, Y and Q are as defined above.

2. The process of claim 1 wherein X, Y and Q are H, the reactants are employed in about equal parts, the fatty acid or rosin acid mixture is tall oil and is employed in 3 to 5 parts, all parts by weight, and the temperature is 190° to 225° C.

3. The process of claim 2 wherein the condensation is carried out at 210° to 220° C. for about two hours and thereafter the reaction mixture is cooled to 120° to 130° C., diluted with chlorobenzene, cooled further to 50° to 60° C., agitated at this temperature for about two hours and then filtered to separate the product.

References Cited

UNITED STATES PATENTS

| | | | |
|---|---|---|---|
| 1,963,374 | 6/1934 | Ogilvie | 260—289 |
| 2,006,022 | 6/1935 | Kranzlein | 260—287 |

FOREIGN PATENTS

| | | | |
|---|---|---|---|
| 1,523,982 | 3/1968 | France | 260—289 |

DONALD G. DAUS, Primary Examiner

U.S. Cl. X.R.

260—283 CN, 289 QP, 346.3, 398